(12) United States Patent
Kong et al.

(10) Patent No.: US 12,531,247 B2
(45) Date of Patent: Jan. 20, 2026

(54) CELLULOSE-BASED FIBER-TYPE DISPERSANT FOR HYBRID CAPACITIVE ELECTRODES AND METHODS OF MAKING THE SAME

(71) Applicant: GM GLOBAL TECHNOLOGY OPERATIONS LLC, Detroit, MI (US)

(72) Inventors: Dewen Kong, Shanghai (CN); Meiyuan Wu, Shanghai (CN); Si Chen, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 605 days.

(21) Appl. No.: 17/950,738

(22) Filed: Sep. 22, 2022

(65) Prior Publication Data

US 2024/0038996 A1 Feb. 1, 2024

(30) Foreign Application Priority Data

Jul. 26, 2022 (CN) .................... 202210884033.1

(51) Int. Cl.
*H01M 4/62* (2006.01)
*H01G 11/06* (2013.01)
(Continued)

(52) U.S. Cl.
CPC ............ *H01M 4/625* (2013.01); *H01G 11/06* (2013.01); *H01G 11/86* (2013.01);
(Continued)

(58) Field of Classification Search
CPC ...... H01M 4/0404; H01M 4/13; H01M 4/139; H01M 4/62; H01M 4/622; H01M 4/625; H01M 10/0525; H01M 2004/021
See application file for complete search history.

(56) References Cited

U.S. PATENT DOCUMENTS

| 4,896,249 A * | 1/1990 | Endo ............ H01G 11/44 361/502 |
| 10,297,885 B2 | 5/2019 | Gayden et al. |

(Continued)

FOREIGN PATENT DOCUMENTS

| CN | 105632774 A | 6/2016 |
| CN | 117497707 A | 2/2024 |

(Continued)

OTHER PUBLICATIONS

WO-2021131278-A1 English machine translation (Year: 2021).*

(Continued)

*Primary Examiner* — Scott J. Chmielecki
(74) *Attorney, Agent, or Firm* — Harness, Dickey & Pierce, P.L.C.

(57) ABSTRACT

A method of making a capacitor-assisted hybrid electrode for a lithium-ion electrochemical cell includes admixing a solvent, a cellulose-based dispersant, and a plurality of capacitive particles comprising carbon to form a dispersion. The cellulose-based dispersant forms hydrogen bonds with one or more carbonyl-groups on the capacitive particles comprising carbon. The dispersion is combined with an electroactive material, an electrically conductive material, and a binder to form a slurry. The slurry is applied to a current collector and solidified to form the capacitor-assisted hybrid electrode having a composite hybrid active layer on the current collector. Capacitor-assisted hybrid electrodes formed from such methods are also provided.

20 Claims, 3 Drawing Sheets

(51) Int. Cl.
*H01G 11/86* (2013.01)
*H01M 4/02* (2006.01)
*H01M 4/04* (2006.01)
*H01M 10/0525* (2010.01)

(52) U.S. Cl.
CPC ......... *H01M 4/0404* (2013.01); *H01M 4/622* (2013.01); *H01M 10/0525* (2013.01); *H01M 2004/021* (2013.01)

(56) References Cited

U.S. PATENT DOCUMENTS

| | | | |
|---|---|---|---|
| 10,658,663 B2 | 5/2020 | Zhang et al. | |
| 10,826,139 B2 | 11/2020 | Rich et al. | |
| 10,944,100 B2 | 3/2021 | Liu et al. | |
| 11,145,922 B2 | 10/2021 | Li et al. | |
| 11,196,097 B2 | 12/2021 | Gu et al. | |
| 11,205,798 B2 | 12/2021 | Li et al. | |
| 11,239,469 B2 | 2/2022 | Li et al. | |
| 11,295,901 B2 | 4/2022 | Hou et al. | |
| 11,340,299 B2 | 5/2022 | Liu et al. | |
| 11,380,939 B2 | 7/2022 | Su et al. | |
| 11,393,640 B2 | 7/2022 | Lu et al. | |
| 11,404,714 B2 | 8/2022 | Hou et al. | |
| 11,427,914 B2 | 8/2022 | Liu et al. | |
| 11,569,525 B2 * | 1/2023 | Liu | H01G 11/30 |
| 11,600,851 B2 | 3/2023 | Li et al. | |
| 2003/0044680 A1 * | 3/2003 | Umemoto | H01M 4/606 |
| | | | 361/532 |
| 2013/0059174 A1 * | 3/2013 | Zhamu | H01M 4/625 |
| | | | 429/300 |
| 2019/0148084 A1 * | 5/2019 | Hagiya | H01G 11/60 |
| | | | 361/502 |
| 2019/0341648 A1 | 11/2019 | Wu et al. | |
| 2020/0118770 A1 | 4/2020 | Liu et al. | |
| 2021/0050157 A1 * | 2/2021 | Hou | H01G 11/24 |
| 2021/0065992 A1 | 3/2021 | Lu et al. | |
| 2021/0065993 A1 | 3/2021 | Liu et al. | |
| 2021/0110979 A1 | 4/2021 | Que et al. | |
| 2021/0110980 A1 | 4/2021 | Su et al. | |
| 2021/0125791 A1 | 4/2021 | Li et al. | |
| 2021/0135224 A1 | 5/2021 | Hou et al. | |
| 2021/0151260 A1 | 5/2021 | Kong et al. | |
| 2021/0151809 A1 | 5/2021 | Kong et al. | |
| 2022/0181635 A1 | 6/2022 | Kong et al. | |
| 2025/0223519 A1 * | 7/2025 | Li | C11D 3/046 |

FOREIGN PATENT DOCUMENTS

| | | | |
|---|---|---|---|
| DE | 112016006819 T5 | 1/2019 | |
| DE | 102022120710 A1 | 2/2024 | |
| JP | 2005116829 A | 4/2005 | |
| JP | 2010171212 A | 8/2010 | |
| WO | 2021066174 A1 | 4/2021 | |
| WO | WO-2021131278 A1 * | 7/2021 | ............. H01M 4/62 |

OTHER PUBLICATIONS

First Office Action for German Patent Application No. 10 2022 120 710.2 issued on Mar. 15, 2023, with correspondence from Manitz Finsterwald Patent-und Rechtsanwaltspartnerschaft mbB summarizing Office Action; 8 pages.

Second Office Action for German Patent Application No. 10 2022 120 710.2 issued on Nov. 24, 2025, with correspondence from Manitz Finsterwald Patent- und Rechtsanwaltspartnerschaft mbB summarizing Office Action; 6 pages.

* cited by examiner

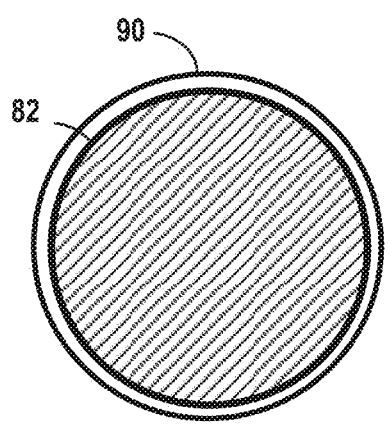
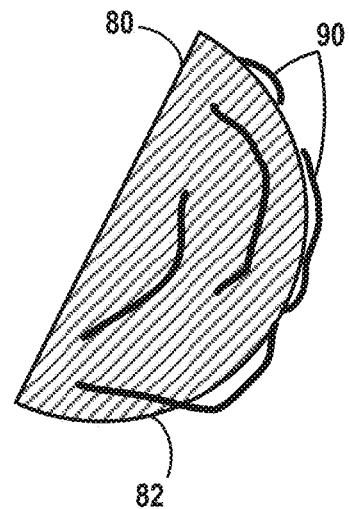
FIG. 3A    FIG. 3B
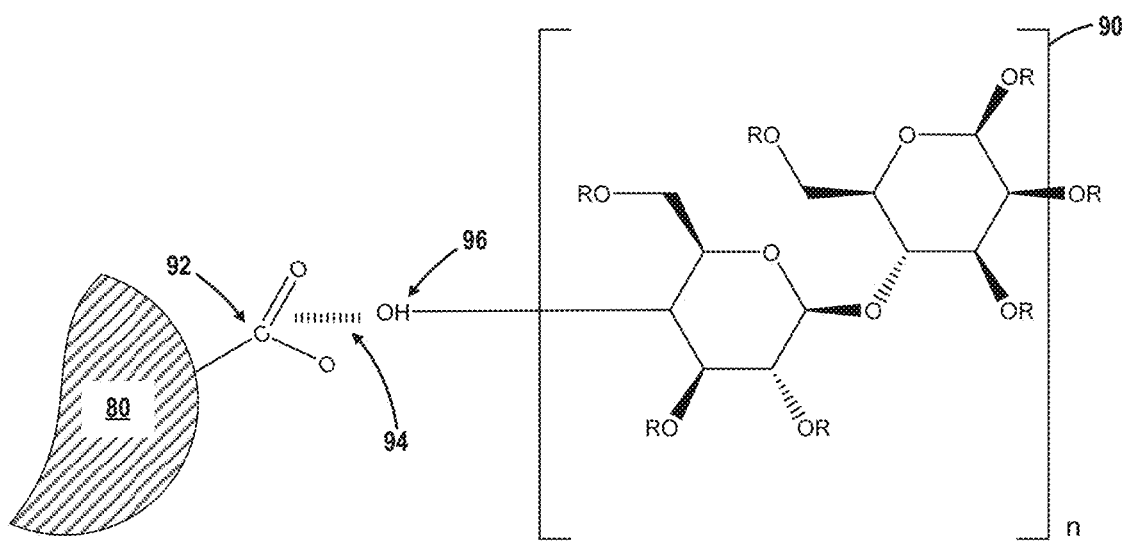
FIG. 3C

CELLULOSE-BASED FIBER-TYPE DISPERSANT FOR HYBRID CAPACITIVE ELECTRODES AND METHODS OF MAKING THE SAME

CROSS-REFERENCE TO RELATED APPLICATIONS

This application claims the benefit of Chinese Patent Application No. 202210884033.1 filed on Jul. 26, 2022. The entire disclosure of the application referenced above is incorporated herein by reference.

INTRODUCTION

This section provides background information related to the present disclosure which is not necessarily prior art.

The present disclosure relates to hybrid lithium-ion electrochemical cells having high-energy capacity, by inclusion of an electroactive material, and high power capacity, by inclusion of a capacitive material. Such, capacitor-assisted hybrid lithium-ion electrochemical cells have enhanced distribution of capacitive materials for high performance.

High-energy density electrochemical cells, such as lithium-ion batteries can be used in a variety of consumer products and vehicles, such as hybrid or electric vehicles, including start-stop systems (e.g., 12V start-stop systems), battery-assisted systems ("OAS"), Hybrid Electric Vehicles ("HEVs"), and Electric Vehicles ("EVs"). Typical lithium-ion batteries include cells each having a first electrode (e.g., a positive electrode or cathode) and a second electrode (e.g., a negative electrode or anode) an electrolyte in the form of a liquid, semi-solid/gel, or solid, and a microporous polymeric separator when a liquid electrolyte is present.

Lithium-ion batteries operate by reversibly passing lithium ions between the negative electrode and the positive electrode. The electrolyte is suitable for conducting lithium ions. Lithium ions move from a cathode (positive electrode) to an anode (negative electrode) during charging of the battery, and in the opposite direction when discharging the battery. A stack of lithium-ion battery cells may be electrically connected in an electrochemical device to increase overall output. Each of the negative and positive electrodes within a stack is connected to a current collector (typically a metal, such as copper foil for the anode and aluminum foil for the cathode). During battery usage, the current collectors associated with the two electrodes are connected by an external circuit that allows current generated by electrons to pass between the electrodes to compensate for transport of lithium ions.

One approach to increase the power of lithium-ion electrochemical cells is to create systems that include hybrid electrodes with both a high energy capacity electroactive material that stores and cycles lithium ions and a high power capacity material that may be a capacitive material. Energy capacity or density is an amount of energy the battery can store with respect to its mass (watt-hours per kilogram (Wh/kg)). Power capacity or density is an amount of power that can be generated by the battery with respect to its mass (watts per kilogram (W/kg)). Thus, a hybrid cell may have a high-energy capacity, by inclusion of an electroactive material, and a high power capability, by inclusion of a capacitive material. These hybrid cells may be referred to as capacitor-assisted lithium-ion batteries.

The electroactive material and the capacitive material may be included independently or as combined in a single electrode. Hybrid electrodes may be referred to as capacitor-assisted electrodes, which may include positive or cathode capacitor-assisted electrodes also known as "cabodes." Mixing high energy capacity and high power capacity electrodes together in a single hybrid electrode can provide performance advantages and simplify manufacturing. However, certain carbon-based high power capacitive materials, such as activated carbon, pose challenges. Activated carbon has a relatively high surface area and thus activated carbon particles may agglomerate together during manufacturing and further may agglomerate with carbon-based electrically conductive particles that may also be present in the electrode. When agglomerations form from these particles, the materials are not fully and evenly dispersed in the active layer and thus can undesirably reduce the uniformity of active components, increasing electrode resistance and degrading the electrode power performance. It would be advantageous to develop hybrid electrodes for high power hybrid lithium-ion cells, which along with high power capacity and high energy capacity, also have low resistance, uniform current density, and good electrode power performance.

SUMMARY

This section provides a general summary of the disclosure, and is not a comprehensive disclosure of its full scope or all of its features.

The present disclosure relates to a method of making a capacitor-assisted hybrid electrode for a lithium-ion electrochemical cell. In certain aspects, the method includes admixing a solvent, a cellulose-based dispersant, and a plurality of capacitive particles including carbon to form a dispersion. The cellulose-based dispersant forms hydrogen bonds with one or more carbonyl-groups on the capacitive particles including carbon. The method also includes combining the dispersion with an electroactive material, an electrically conductive material, and a polymeric binder to form a slurry. The slurry is applied to a current collector and then solidified to form the capacitor-assisted hybrid electrode having a composite hybrid active layer on the current collector.

In one aspect, the cellulose-based dispersant is selected from the group consisting of: methyl cellulose, hydroxyethyl cellulose, hydroxypropyl methyl cellulose, hydroxypropyl cellulose, carboxymethyl cellulose, and combinations thereof.

In one aspect, the dispersion is a first dispersion and the method further includes forming a second dispersion by combining the polymeric binder with a second solvent. The method also further includes adding the electrically conductive material to the polymeric binder and the second solvent. Next, the first dispersion and the second dispersion are combined. The electroactive material is then introduced to the combined first and second dispersions to form the slurry.

In one aspect, the binder is in powder form and the method further includes dry mixing the binder, the electrically conductive material, and the electroactive material together to form a dry mixture. A second solvent is added to the dry mixture to form an admixture. The admixture is kneaded and then a third solvent is added to and mixed with the admixture to form the slurry.

In one aspect, a ratio of mass of the cellulose-based dispersant to the plurality of capacitive particles including carbon is greater than or equal to about 1:10,000 to less than or equal to about 1:4.

In one aspect, a mass ratio of cellulose-based dispersant to the plurality of capacitive particles including carbon is greater than or equal to about 1:200 to less than or equal to about 1:20.

In one aspect, the dispersion further includes a non-ionic ester-based surfactant.

In one aspect, a ratio of mass of the cellulose-based dispersant to a total mass of the composite hybrid active layer is greater than or equal to about 1:100,000 to less than or equal to about 1:20.

In one aspect, a ratio of mass of the cellulose-based dispersant to a total mass of the composite hybrid active layer is greater than or equal to about 1:5,000 to less than or equal to about 1:100.

In one aspect, the plurality of capacitive particles including carbon include activated carbon and the electrically conductive material includes carbon black.

In one aspect, the plurality of capacitive particles including carbon are homogeneously distributed in the composite hybrid active layer.

In one aspect, the electroactive material is a positive electroactive material selected from the group consisting of: a rock salt layered oxide, a spinel, a polyanion cathode, a lithium-transition metal oxide, a lithium borate, a lithium-silicon alloying compound, lithium-tin alloying compound, lithium metal, lithium alloy, lithiated metal oxide/sulfide, lithium sulfide, sulfur, and combinations thereof.

In one aspect, the composite hybrid active layer includes the electroactive material at greater than or equal to about 50% to less than or equal to about 96% by mass of the composite hybrid active layer, the plurality of capacitive particles including carbon at greater than or equal to about 2% to less than or equal to about 30% by mass of the composite hybrid active layer, the electrically conductive material at greater than or equal to about 0.5 to less than or equal to about 15% by mass of the composite hybrid active layer, the polymeric binder at greater than or equal to about to less than or equal to about 10% by mass of the composite hybrid active layer, and the cellulose-based dispersant at greater than or equal to about 0.01% to less than or equal to about 5% by mass of the composite hybrid active layer.

The present disclosure further relates to a capacitor-assisted hybrid electrode for a lithium-ion electrochemical cell. In certain aspects, the capacitor-assisted hybrid electrode includes a composite hybrid active layer that includes a plurality of electroactive particles for cycling lithium ions, a plurality of capacitive particles including carbon each having a modified surface, a plurality of electrically conductive particles including carbon, and a polymeric matrix in which the plurality of electroactive particles and the plurality of capacitive particles are distributed. The modified surface of the plurality of capacitive particles including carbon includes a cellulose-based dispersant associated with carbonyl groups on each of the capacitive particles including carbon. The capacitor-assisted hybrid electrode further includes a current collector on which the composite hybrid active layer is disposed.

In one aspect, the plurality of capacitive particles and the plurality of electrically conductive particles are evenly distributed throughout the composite hybrid active layer.

In one aspect, the plurality of capacitive particles including carbon and the plurality of electrically conductive particles including carbon are homogeneously distributed in the composite hybrid active layer.

In one aspect, the plurality of electroactive particles includes a positive electroactive material selected from the group consisting of: a rock salt layered oxide, a spinel, a polyanion cathode, a lithium-transition metal oxide, a lithium borate, a lithium-silicon alloying compound, lithium-tin alloying compound, lithium metal, lithium alloy, lithiated metal oxide/sulfide, lithium sulfide, sulfur, and combinations thereof.

In one aspect, the composite hybrid active layer includes the plurality of electroactive particles at greater than or equal to about 50% to less than or equal to about 96% by mass of the composite hybrid active layer, the plurality of capacitive particles including carbon at greater than or equal to about 2% to less than or equal to about 30% by mass of the composite hybrid active layer, the electrically conductive particles at greater than or equal to about 0.5 to less than or equal to about 15% by mass of the composite hybrid active layer, the polymeric binder at greater than or equal to about 0.5 to less than or equal to about 10% by mass of the composite hybrid active layer, and the cellulose-based dispersant at greater than or equal to about 0.01% to less than or equal to about 5% by mass of the composite hybrid active layer.

In one aspect, a ratio of mass of the cellulose-based dispersant to the plurality of capacitive particles including carbon is greater than or equal to about 1:10,000 to less than or equal to about 1:4.

In one aspect, a ratio of mass of the cellulose-based dispersant to a total mass of the composite hybrid active layer is greater than or equal to about 1:100,000 to less than or equal to about 1:20.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIGS. 3A-3C show a surface-modified capacitive particle comprising carbon processed with a cellulose-based dispersant in methods according to certain aspects of the present disclosure. FIG. 3A shows a surface-modified capacitive particle. FIG. 3B shows a detailed partial view of the surface-modified capacitive particle of FIG. 3A where the cellulose-based dispersant is in a fiber form and the fibers are associated with the surface. FIG. 3C shows hydrogen bonding of the cellulose-based dispersant with active carbon groups on the surface of the capacitive particle in accordance with certain aspects of the present disclosure.

Corresponding reference numerals indicate corresponding parts throughout the several views of the drawings.

DETAILED DESCRIPTION

Figure 1:
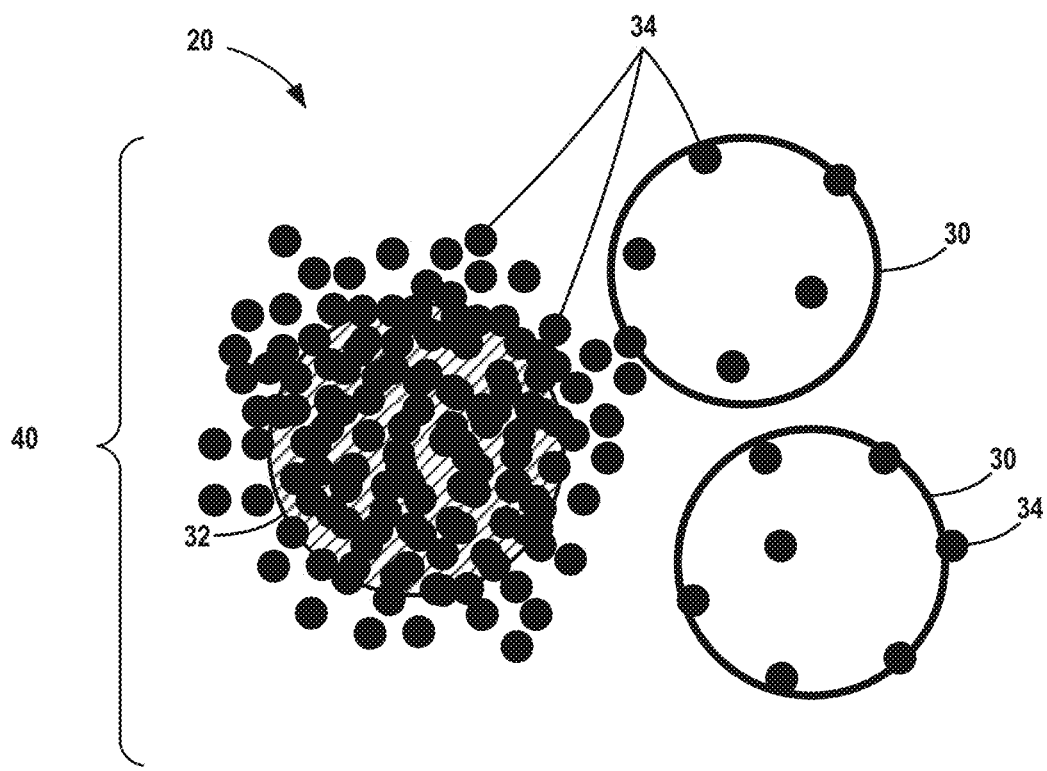
FIG. 1 shows uneven distribution of active components in a detailed region of a conventional capacitor-assisted hybrid electrode 20 formed in a conventional slurry casting process.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present disclosure pertains to electrochemical cells including capacitors or hybrid supercapacitor-battery systems (e.g., capacitor-assisted batteries ("CAB")), which integrate the high power density of capacitors with high energy density of lithium-ion batteries, that may be used in, for example, automotive or other vehicles (e.g., motorcycles, boats, tractors, buses, mobile homes, campers, and tanks), but may also be used in a variety of other industries and applications, such as consumer electronic devices, consumer goods, aerospace components, buildings (e.g., houses, offices, sheds, and warehouses), office equipment and furniture, and industrial equipment machinery, agricultural or farm equipment, or heavy machinery, by way of non-limiting example.

A typical lithium-ion battery includes a first electrode (such as a positive electrode or cathode) opposing a second electrode (such as a negative electrode or anode) and a separator and/or electrolyte disposed therebetween. Often, in a lithium-ion battery pack, batteries or cells may be electrically connected (e.g., in a stack) to increase overall output. Lithium-ion batteries operate by reversibly passing lithium ions between the first and second electrodes. For example, lithium ions may move from a positive electrode to a negative electrode during charging of the battery, and in the opposite direction when discharging the battery. The electrolyte is suitable for conducting lithium ions and may be in liquid, gel, or solid form.

In hybrid capacitor-battery systems (e.g., capacitor-assisted batteries), a capacitor may be integrated with the lithium-ion battery or cell stack. A capacitor may include one or more capacitor components or layers, such as a positive electrode or cathode that can function as a capacitor in conjunction with a corresponding negative electrode or anode, that are parallel or stacked with the one or more electrodes that form the lithium-ion battery. The one or more capacitor components or layers may be integrated within a housing defining the lithium-ion battery or stack, such that a capacitor component is also in communication with the electrolyte of the lithium-ion battery. Each of the negative and positive electrodes and capacitor components within a hybrid battery pack or cell stack may be connected to a current collector (typically a metal, such as copper for the anode and/or capacitor-assisted anode and aluminum for the cathode and/or capacitor-assisted cathode). During battery usage, the current collectors associated with the (stacked) electrodes are connected by an external circuit that allows current generated by electrons to pass between the electrodes to compensate for transport of lithium ions.

In various aspects, the present disclosure provides methods of making a capacitor-assisted hybrid electrode for a lithium-ion electrochemical cell, as well as the capacitor-assisted hybrid electrode itself. The hybrid electrode incorporates both an electroactive material and a capacitive material into a single porous composite hybrid active layer. The active layer may thus include a plurality of electroactive particles for cycling lithium ions as well as a plurality of capacitive particles for rapid electrical discharge. In certain aspects, the plurality of capacitive particles comprise carbon. For example, the capacitive particles may be include a capacitive electric double-layer capacitor material selected from the group consisting of activated carbon, carbon xerogel, carbon aerogel, carbon nanotube, mesoporous carbon, templated carbon, carbide-derived carbon, graphene, porous carbon spheres, heteroatom-doped carbon, and combinations thereof. Such capacitive materials are known in the art to provide high power capability for a lithium ion electrochemical cell and may be contrasted with electrically conductive carbon-based materials, like carbon black, which do not provide capacitive performance capabilities. In certain aspects, the plurality of capacitive particles comprises activated carbon. Further, the surface of each the plurality of capacitive particles is modified by treatment with a dispersant that facilitates uniform mixing of the capacitive particles in the porous composite hybrid active layer disposed on a current collector, as will be described further herein.

By way of background, conventional manufacturing to make a positive capacitor-assisted hybrid electrode or cabode, by combining activated carbon with a positive electroactive material, like lithium nickel manganese cobalt oxide ($Li(Ni_xMn_yCo_z)O_2$, where $0 \leq x \leq 1$, $0 \leq y \leq 1$, $0 \leq z \leq 1$, and $x+y+z=1$, abbreviated NMC, for example, $LiNi_{0.6}Mn_{0.2}Co_{0.2}O_2$ (NMC 622) has posed challenges. In a conventional slurry casting manufacturing process of a hybrid electrode/cabode, a binder in solvent forms a solution, followed by adding electrically conductive particles to the solvent to form a first dispersion, followed by adding activated carbon capacitive particles to form a second dispersion, then adding the electroactive particles. The amount of solvent can be adjusted to form a slurry that is then cast onto a current collector, where the solvent is removed to solidify the material and form a composite active layer over the current collector. Such hybrid cabodes incorporating activated carbon have exhibited relatively high electrode resistance, delivering higher cell charge resistance, and having lower cold cranking capability. Activated carbon material has a large specific surface area (for example, approximately 1600 $m^2/g$) and has a tendency to agglomerate, which makes it difficult to evenly distribute in the composite hybrid active layer with the electroactive material. Moreover, hybrid electrodes often further contain electrically conductive particles, like carbon black, in the porous composite hybrid active layer, which further compounds the challenges. During such a typical slurry casting process to form the composite active layer, a conductive carbon black particle agglomerates with the activated carbon particles when they are combined, so that neither the activated carbon nor the carbon black particles can be fully dispersed, which leads to uneven and non-uniform distribution of conductive carbon black particles preventing their distribution around the electroactive materials to enhance electrical conduction and electrode performance. As such, the presence of activated carbon as a capacitive material promotes agglomeration with the carbon black particles, thus reducing the uniformity of electrode components distributed in the porous composite hybrid active layer that includes the electroactive material, conductive fillers and binder, which increases electrode resistance and degrades the electrode power performance.

By way of example, FIG. 1 shows uneven distribution of active components in a detailed region of a conventional hybrid electrode 20. Electroactive material particles 30 and an activated carbon capacitive particle 32 are distributed within an active layer 40. A plurality of electrically conductive carbon black particles 34 are likewise distributed within the active layer 40, but are predominantly agglomerated around the activated carbon capacitive particle 32. The plurality of carbon black particles 34 are only sparsely associated with the electroactive material particles 30. As such, the uneven/non-uniform distribution of carbon black particles 34 leads to the electrode performance shortcomings described above.

To address these challenges, in certain aspects, the present disclosure contemplates treating a surface of the capacitive particles comprising carbon with a cellulose-based dispersant, which is a cellulose derivative that may include, a hydroxy alkyl cellulose or other cellulose derivative where at least one hydroxyl group on the cellulose is modified or substituted by an alkyl group. The surface of the capacitive particles comprising carbon may have active oxygen groups. The cellulose-based dispersant thus associates with the surface of the capacitive particles, for example, forming hydrogen bonds with one or more carbonyl-groups on the carbon-containing capacitive particles. In certain aspects, the cellulose-based dispersant has one or more of the R groups on the ether of the cellulose (in other words hydrogen in the hydroxyl groups of the cellulose) substituted with an alkyl group. By way of example, the cellulose-based dispersant may be selected from the group consisting of: methyl cellulose (MC), hydroxyethyl cellulose (HEC), hydroxypropyl methyl cellulose (HPMC), hydroxypropyl cellulose (HPC), carboxymethyl cellulose (CMC), and combinations thereof. In certain variations, the cellulose-based dispersant may comprise methyl cellulose (MC) and may have a fiber-type morphology.

Hydroxyl groups on the hydroxy alkyl dispersant molecules, like MC, can thus bond with carboxyl groups on a surface of the carbon-based capacitive material, like activated carbon, providing benefits of dispersing activated carbon with electrically conductive carbon particles, so that the activated carbon dispersion is stabilized and further agglomeration between activated carbon and conductive carbons is minimized or avoided. In this manner, the activated carbon and conductive carbon particles may be evenly distributed within the porous composite hybrid active layer so that electrode performance is enhanced with reduced electrode resistance and good power performance.

Figure 2:
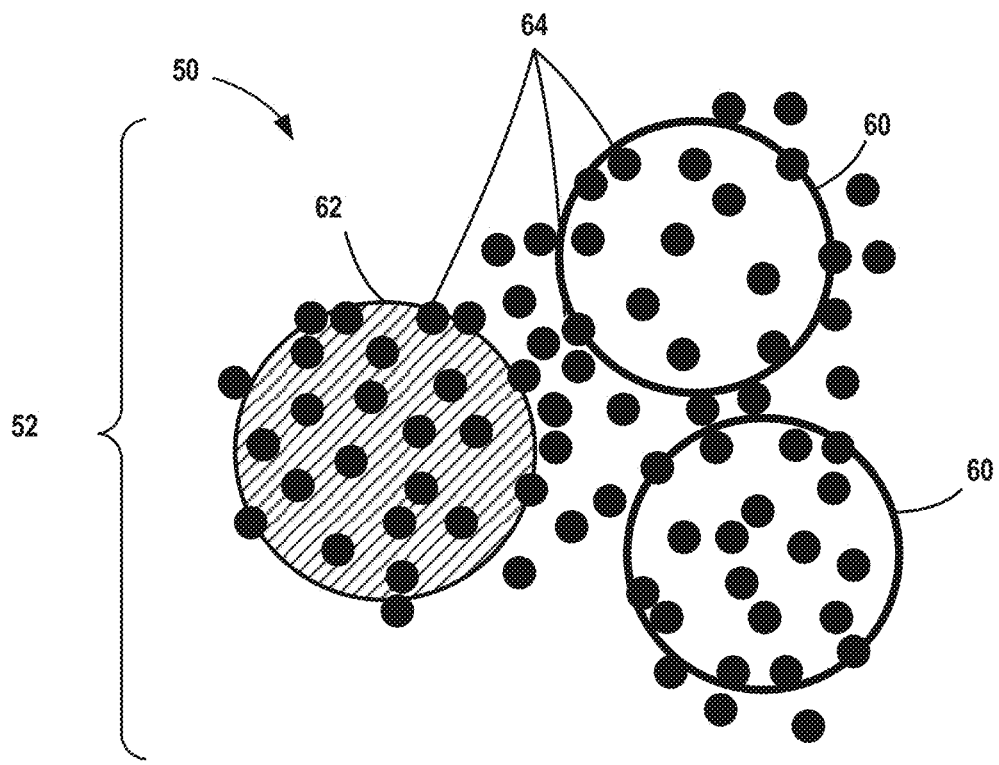
FIG. 2 shows a capacitor-assisted hybrid electrode prepared in accordance with certain aspects of the present disclosure that incorporates a capacitive particle comprising carbon having a surface modified with a cellulose-based-derived dispersant to enhance distribution of the particles in an active hybrid layer of the electrode.

By way of example, FIG. 2 demonstrates a hybrid electrode 50 prepared in accordance with certain aspects of the present disclosure that use the cellulose-derived dispersant to enhance distribution of the particles in an active layer 52. Electroactive material particles 60 and an activated carbon capacitive particle 62 are distributed within an active layer 52. A plurality of electrically conductive carbon black particles 64 are likewise distributed within the active layer 52. The carbon black particles 64 are more evenly distributed around both the activated carbon capacitive particle 62 and the electroactive material particles 60. As such, the even/uniform distribution of carbon black particles 64 around both the electroactive material particles 60 and an activated carbon capacitive particle 62, along with reduced agglomeration of activated carbon capacitive particles 62 with one another leads to improved electrode performance.

In certain aspects, the present disclosure contemplates methods of making a capacitor-assisted hybrid electrode for a lithium-ion electrochemical cell. The method may comprise admixing a carrier or solvent (referred to herein as a solvent, although the particles may in fact only be suspended in the liquid), an cellulose-based dispersant, and a plurality of capacitive particles comprising carbon to form a dispersion. The solvent/carrier can be an aqueous solvent, such as water, or a non-aqueous solvent, such as N-methyl-2-pyrrolidone (NMP).

During this process, the cellulose-based dispersant may be mixed with the capacitive particles to associate with the surfaces of each of the capacitive particles comprising carbon and thus provides a surface-modified plurality of capacitive particles comprising carbon. More specifically, the cellulose-based dispersant may form hydrogen bonds with one or more carbonyl-groups on the capacitive particles. The cellulose-based dispersant and the plurality of capacitive particles comprising carbon may be any of those described above.

FIGS. 3A-3C show a surface-modified capacitive particle 80 processed with a cellulose-based dispersant in the method described above in accordance with certain aspects of the present disclosure. After treatment with a cellulose-based dispersant in the form of methyl cellulose 90, a surface 82 of the particle 80 is associated with the cellulose-based dispersant 90. As best seen in FIG. 3B, the methyl cellulose dispersant 90 is in the form of a fiber. A plurality of the fibers each associates with the surface 82 of the particle 80.

FIG. 3C shows the association between the surface 82 of the particle 80 having active groups in the form of carbonyl groups 92 that associate via a hydrogen bond 94 with a hydroxyl group 96 in the methyl cellulose dispersant 90. The methyl cellulose dispersant 90 may have an R group as a methyl ($CH_3$) or hydrogen (H), where at least one hydrogen is present for hydrogen bonding and "n" may range from greater than or equal to about 50 to less than or equal to about 1,000. By way of example, a suitable molecular weight of the methyl cellulose may be greater than or equal to about 10,000 g/mol to less than or equal to about 220,000 g/mol.

In certain variations, a mass ratio of cellulose-based dispersant to the plurality of capacitive particles comprising activated carbon is greater than or equal to about 1:10,000 to less than or equal to about 1:4, in other words, a ratio of greater than or equal to about 0.01% to less than or equal to about 20% by mass. In certain variations, when a ratio of cellulose-based dispersant to the plurality of capacitive particles comprising activated carbon is greater than or equal to about 0.01% to less than or equal to about 20% by mass, greater than or equal to about 0.001% to less than or equal to about 80% of a surface area of the surface of the capacitive particles comprising activated carbon is covered by the dispersant. In certain variations, the mass ratio of cellulose-based dispersant to the plurality of capacitive particles comprising activated carbon is greater than or equal to about 1:200 to less than or equal to about 1:20, in other words, a ratio of greater than or equal to about 0.5% to less than or equal to about 5% by mass.

In certain variations, the cellulose-based dispersant is added to the dispersion at greater than or equal to about 0.003% by mass to less than or equal to about 7% by mass of a total dispersion mass. Likewise, the carrier/solvent may be added to the dispersion at greater than or equal to about 25% by mass to less than or equal to about 67% by mass of a total dispersion mass is added to the dispersion.

In certain variations, a surface active agent/surfactant may be added to the dispersion. For example, the dispersion may further comprise an ester-based surfactant. For example, the surfactant may be a non-ionic surfactant, such as a fatty acid ester-based surfactant or high-grade ester-based surfactant, for example, a fatty alcohol polyoxyethylene ether. Suitable examples of such a surfactant include alcohol polyoxyethylene ether ($AEO_9$), $RO(CH_2CH)_nH$ where R is $C_{12}$ or $C_{12-14}$, sorbitan fatty acid ester (SPAN), such as $C_{60}H_{114}O_8$, fatty alcohol polyoxyethylene ether, sodium sulfate $RO(CH_2CH_2O)_n$—$SO_3Na$, where n is 2 or 3 and R is $C_{12-15}$, polyoxyethylene alkyl ethers (APEO), polymer polyvinylpyrrolidone (PVP), and any combinations thereof. In certain aspects, greater than or equal to about 0.001% to less than or equal to about 5% by mass of the surfactant may be added to the dispersion, or optionally greater than or equal to about 0.02% to less than or equal to about 1% by mass.

The dispersion that is formed from the admixing of cellulose-based dispersant and plurality of capacitive particles comprising carbon in the solvent/carrier may then be combined with an electroactive material, an optional electrically conductive material, and a binder to form a slurry. The electroactive materials, electrically conductive materials, and binders will be described further herein. Additional solvent may be added to adjust the solids content and/or viscosity of the slurry so that it can be further processed by applying or casting onto a substrate. The slurry may have a viscosity of greater than or equal to about 3,500 to less than or equal to about 10,000 mPa·s (at room temperature (approximately 21° C. (70° F.)), optionally greater than or equal to about 4,500 to less than or equal to about 6,500 mPa·s, and in one variation, about 5,010 mPa·s at room temperature. A suitable solids content in the slurry suspension may be greater than or equal to about 35% by mass to less than or equal to about 75% by mass of solids, optionally greater than or equal to about 40% by mass to less than or equal to about 55% by mass of solids, and in one variation, about 45% solids content with a balance liquids. The slurry can be mixed or agitated, and then applied to a substrate. The substrate can be a removable substrate or alternatively a functional substrate, such as a current collector (such as a metallic grid or mesh layer). If the substrate is removable, the porous composite hybrid active layer that is formed is removed from the substrate and then further laminated to a current collector.

For example, the slurry may be applied to a surface of a current collector. The current collector may be formed of an electrically conductive metal that will be further described below and may be in the form of a thin film or foil, a clad foil, a porous metal foam layer, or an open mesh or grid, such as a slit mesh, woven mesh, and like, on which the slurry can be cast to form a porous composite hybrid active layer, by way of example. The method then comprises solidifying the slurry, for example, by removing the solvent to form the capacitor-assisted hybrid electrode having the composite hybrid active layer on the current collector.

In one variation, heat or radiation can be applied to volatilize/evaporate the solvent from the active material film, leaving a solid residue. The porous composite hybrid active film may be further consolidated, where heat and pressure are applied to the film to sinter and calendar it. In other variations, the film may be air-dried at moderate temperature to form a film.

In certain aspects, the precursors of the positive electroactive material layer may be distributed in a slurry with a carrier or solvent and may have a viscosity of greater than or equal to about 3,500 to less than or equal to about 10,000 mPa·s (at room temperature (approximately 21° C. (70° F.)). The slurry can be mixed or agitated, and then applied to a substrate. The substrate can be a removable substrate or alternatively a functional substrate, such as a current collector (such as a metallic grid or mesh layer). In one variation, heat or radiation can be applied to evaporate the solvent from the active material film, leaving a solid residue. The electrode film may be further consolidated, where heat and pressure are applied to the film to sinter and calendar it. In other variations, the film may be air-dried at moderate temperature to form self-supporting films. If the substrate is removable, then it is removed from the active material film that is then further laminated to a current collector. With either type of substrate, it may be necessary to extract or remove the remaining plasticizer prior to incorporation into the battery cell.

A porosity of the composite hybrid active material layer, whether the positive or negative electrode after all processing is completed (including consolidation and calendering) may considered to have a fraction of void volume defined by pores over the total volume of the active material layer. The porosity may be greater than or equal to about 15% by volume to less than or equal to about 50% by volume, optionally greater than or equal to about 20% by volume to less than or equal to about 40% by volume, and in certain variations, optionally greater than or equal to about 25% by volume to less than or equal to about 35% by volume.

With renewed reference to the methods of the present disclosure, in certain variations, the dispersion containing the cellulose-based dispersant, the plurality of capacitive particles, and the carrier/solvent is a first dispersion. The method may further comprise forming a second dispersion by combining the binder with a second solvent. Then, the electrically conductive material, such as carbon black particles, may be added to the second dispersion already containing the binder and the second solvent and may be mixed. The method then comprises combining the first dispersion and the second dispersion together to form an admixture. Next, the electroactive material may be added to the admixture and additional mixing may occur. An amount of solvent/carrier in the admixture may be adjusted to form the slurry with a predetermined solids content that is ready to apply or cast on a substrate, such as the current collector.

In other variations, the method may include a dry powder mixing as part of the process. The dispersion containing the cellulose-based dispersant, the plurality of capacitive particles, and the carrier/solvent is a first dispersion. In such a variation, the binder is in a powder or solid particulate form. The method further comprises dry mixing the binder powder with the electrically conductive material particles and the electroactive material particles. This blending process forms a dry mixture. The method further comprises adding a second solvent to the dry mixture to form an admixture. The admixture may then be kneaded. Finally a third solvent to the admixture and mixed to form a second dispersion. The first dispersion containing the cellulose-based dispersant, the plurality of capacitive particles, and the carrier/solvent may be combined and mixed with the second dispersion. Additional solvent may be added to form the slurry with a predetermined solids content that is ready to apply or cast on a substrate, such as the current collector.

Figure 4:
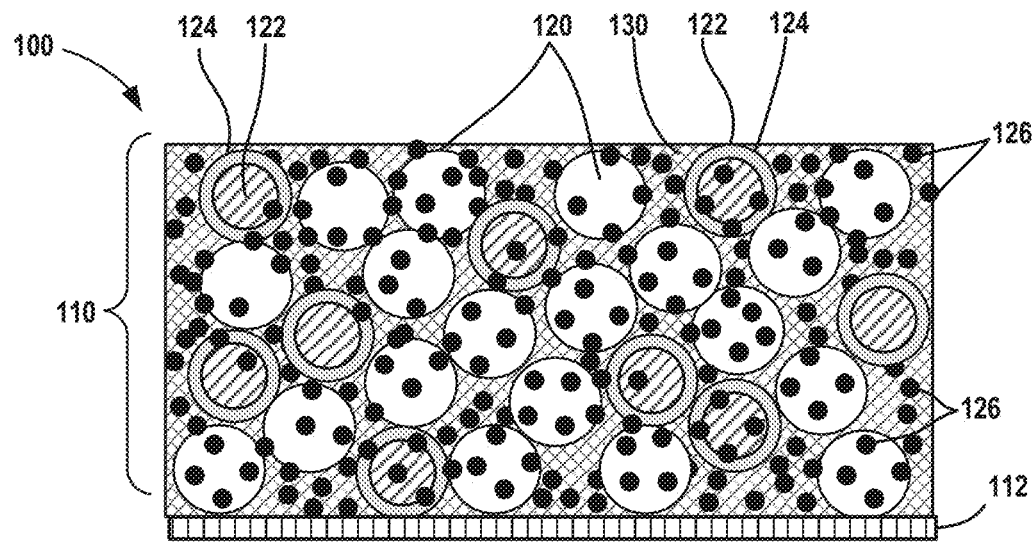
FIG. 4 shows an example of a capacitor-assisted hybrid electrode for a lithium-ion electrochemical cell prepared in accordance with certain aspects of the present disclosure that incorporates surface modified capacitive particles comprising carbon and having even distribution of components in the composite hybrid active layer.

FIG. 4 shows an example of a capacitor-assisted hybrid electrode 100 for a lithium-ion electrochemical cell prepared in accordance with certain aspects of the present disclosure. The hybrid electrode 100 includes a composite hybrid active layer 110 disposed on a current collector 112. The composite hybrid active layer 110 includes a plurality of electroactive particles 120 for cycling lithium ions. Further, the composite hybrid active layer 110 has a plurality of capacitive particles comprising carbon, for example, activated carbon particles 122. Each of the activated carbon particles 122 has a modified surface 124 that comprises a cellulose-based dispersant associated with carbonyl groups on each of the activated carbon particles 122, as described above. The composite hybrid active layer 110 further comprises a plurality of electrically conductive particles, for example, carbon black particles 126.

The composite hybrid active layer 110 further has a porous polymeric matrix 130 in which the plurality of electroactive particles 120, activated carbon particles 122, and carbon black particles 126 are distributed. While not shown, the polymeric matrix 130 may have a plurality of pores formed therein that may optionally be imbibed with a liquid or semi-solid/gel electrolyte. The composite hybrid active layer 110 may also have solid-state electrolyte particles distributed therein (not shown in FIG. 4). In certain variations, the plurality of capacitive particles comprising carbon (e.g., activated carbon particles 122) and/or electrically conductive particles (e.g., carbon black particles 126) are evenly or uniformly distributed throughout the composite hybrid active layer 110. By evenly or uniformly distributed, it is meant that no large particle agglomerations are present in the composite hybrid active layer 110, although the particles may not necessarily be homogeneously distributed throughout the composite hybrid active layer 110. However, as can be seen in FIG. 4, the activated carbon particles 122 and carbon black particles 126 are dispersed throughout the composite hybrid active layer 110. The carbon black particles 126 are associated with surfaces of both the activated carbon particles 122 as well as the electroactive material particles 120. In certain variations, the particles (for example, either activated carbon particles 122, carbon black particles 126, or both) are homogenously distributed throughout the composite hybrid active layer 110.

In certain variations, the capacitor-assisted hybrid electrode 100 may be a positive electrode or cathode and thus referred to as a cabode. The electroactive particles 120 in composite hybrid active layer 110 may comprise a lithium-based positive electroactive material that is capable of undergoing lithium intercalation and deintercalation, absorption and desorption, alloying and dealloying, or plating and stripping, while functioning as a positive terminal of the battery. For example, in certain variations, the lithium ion battery positive electrode material particles may comprise a material that can store (insertion) and release (extraction) lithium ions via reversible electrochemical intercalation reactions, so that the positive electroactive material may be generally described as an intercalation host material. The reversible electrochemical intercalation reactions that occur during the insertion and extraction of lithium ions from the positive electroactive material may comprise electrochemical oxidation-reduction (redox) reactions. During discharge, the positive electroactive material may accept electrons (and lithium ions) as a result of an electrochemical reduction reaction and, during charging, may release electrons (and lithium ions) as a result of an electrochemical oxidation reaction. The positive electroactive material may comprise a lithium-based intercalation host material having a higher electrochemical intercalation potential than the intercalation host material of the negative electroactive material.

In various aspects, the positive electroactive material may be a plurality of solid-state electroactive particles. In certain variations, the hybrid active layer of the positive capacitor-assisted electrode may include a positive electroactive material that is one of a layered-oxide cathode, a spinel cathode, and a polyanion cathode. For example, in the instances of a layered-oxide cathode (e.g., rock salt layered oxides), the positive solid-state electroactive particles may comprise one or more positive electroactive materials selected from LiN$i_x$Mn$_y$Co$_{1-x-y}$O$_2$ (where 0≤x≤1 and 0≤y≤1), also referred to as NMC, such as LiMn$_{0.33}$Ni$_{0.33}$Co$_{0.33}$O$_2$ (abbreviated NMC 333 or NMC 111), LiMn$_{0.6}$Ni$_{0.2}$Co$_{0.2}$O$_2$ (NMC 622), LiMn$_{0.5}$Ni$_{0.2}$Co$_{0.3}$O$_2$ (NMC 523), LiMn$_{0.7}$Ni$_{0.2}$Co$_{0.1}$O$_2$ (NMC 721), LiMn$_{0.8}$Ni$_{0.1}$Co$_{0.1}$O$_2$(NMC 811), LiNi$_x$Mn$_y$Al$_{1-x-y}$O$_2$ (where 0<x≤1 and 0<y≤1) (NMA), LiNi$_x$Mn$_{1-x}$O$_2$ (where 0<x≤1) (NM), such as LiNi$_{0.5}$Mn$_{0.5}$O$_2$, LiNi$_{0.5}$Mn$_{1.5}$O$_4$, and Li$_{1+x}$MO$_2$ (where 0<x≤1), wherein M is Co, Ni, Mn, Fe, P, Al, V, such as LiCoO$_2$, LiNiO$_2$, LiMnO$_2$, and combinations thereof. In some specific embodiments, the lithium-based intercalation host material may comprise a layered lithium transition metal oxide, such as lithium cobalt oxide (LiCoO$_2$) and/or lithium-nickel-manganese-cobalt oxide [Li(Ni$_x$Mn$_y$Co$_z$)O$_2$], a spinel lithium transition metal oxide, such as spinel lithium manganese oxide (LiMn$_2$O$_4$), lithium iron phosphate (LiFePO$_4$ or Li$_3$Fe$_3$(PO$_4$)$_4$), lithium fluorophosphate (Li$_2$FePO$_4$F), lithium vanadium phosphate (LiV$_2$(PO$_4$)$_3$), lithium cobalt phosphate (LiCoPO$_4$), lithium manganese phosphate (LiMnPO$_4$), lithium nickel oxide (LiNiO$_2$), lithium nickel-cobalt-aluminum oxide (NCA), lithium aluminum manganese oxide (Li$_x$Al$_y$Mn$_{1-y}$O$_2$), tavorite compounds, such as lithium vanadium fluorophosphate (LiVPO$_4$F), and/or lithium vanadium oxide (LiV$_2$O$_5$), or a lithium transition metal silicate, such as lithium iron silicate (Li$_2$FeSiO4), lithium manganese silicate (Li$_2$MnSiO4), borate compounds, including lithium iron borate (LiFeBO$_3$), lithium cobalt borate (LiCoBO$_3$), lithium manganese borate (LiMnBO$_3$), organic compounds, such as dilithium (2,5-dilithiooxy)terephthalate, polyimide, and any combinations thereof.

In other aspects, the positive electroactive material may be a low voltage cathode material, such as a lithiated metal oxide/sulfide, like lithium titanate sulfide (LiTiS$_2$), lithium sulfide (Li$_2$S), sulfur, and the like. In certain aspects, a positive electroactive material selected from the group consisting of: a rock salt layered oxide, a spinel, a polyanion cathode, a lithium-transition metal oxide, a lithium-silicon alloying compound, lithium-tin alloying compound, lithium metal, lithium alloy, lithiated metal oxide/sulfide, lithium sulfide, sulfur, and combinations thereof. In certain variations, the positive solid-state electroactive particles may comprise one or more positive electroactive materials selected from the group consisting of LiCoO$_2$, LiNi$_x$Mn$_y$Co$_{1-x-y}$O$_2$ (where 0≤x≤1 and 0≤y≤1), LiNi$_x$Mn$_y$Al$_{1-x-y}$O$_2$ (where 0≤x≤1 and 0<y≤1), LiNi$_x$Mn$_{1-x}$O$_2$ (where 0≤x≤1), Li$_{1+x}$MO$_2$ (where 0≤x≤1), LiMn$_2$O$_4$, LiNi$_x$Mn$_{1.5}$O$_4$, LiFePO$_4$, LiVPO$_4$, LiV$_2$(PO$_4$)$_3$, Li$_2$FePO$_4$F, Li$_3$Fe$_3$(PO$_4$)$_4$, Li$_3$V2(PO$_4$)F$_3$, LiFeSiO4, LiTiS$_2$, Li$_2$S, sulfur, and combinations thereof. In certain aspects, the positive solid-state electroactive particles may be coated (for example, by LiNbO$_3$ and/or Al$_2$O$_3$) and/or the positive electroactive material may be doped (for example, by aluminum and/or magnesium).

The positive electrode current collector on which the composite hybrid active layer may be disposed can be formed from aluminum (Al) or any other appropriate electrically conductive material known to those of skill in the art.

Alternatively, the capacitor-assisted hybrid electrode 100 may be a negative electrode. In such a variation, the electroactive material particles may be a negative electroactive material for a negative electrode or anode. The lithium ion battery negative electrode material may have a lower electrochemical intercalation potential than the positive electrode material such that an electrochemical potential difference exists between the electrochemically and/or electroactive material layers of each electrochemical cell. In various aspects, the negative electroactive material may be a plurality of solid-state electroactive particles selected from graphite, hard carbon, soft carbon, silicon, lithium-silicon and silicon containing binary and ternary alloys and/or tin-containing alloys, such as Si—Sn, SiSnFe, SiSnAl, SiFeCo, SnO$_2$, niobium-based materials (e.g., niobium oxide), and the like. In certain alternative embodiments, lithium-titanium anode materials are contemplated, such as titanium oxide (TiO$_2$), Li$_{4+x}$Ti$_5$O$_{12}$, where 0≤x≤3, including lithium titanate (Li$_4$Ti$_5$O$_{12}$) (LTO). Metal oxide sulfides, like FeS, or other lithium-accepting anode active materials are also contemplated. Alternatively, the negative electroactive material may be a layer of lithium metal or an alloy of lithium metal, which typically are not formed as a composite electrode distributed in a binder matrix, but rather as a solid non-porous film. In certain variations, the negative electroactive materials for the negative active layer of the negative electrode may be selected from the group consisting of: lithium, graphite, silicon, silicon-containing alloys, tin-containing alloys, lithium titanate, and combinations thereof. In certain aspects, the plurality of solid-state negative electroactive particles may comprise graphite.

The negative electrode current collector can comprise metal, for example, it may be formed from copper (Cu), nickel (Ni), or alloys thereof or any other appropriate electrically conductive material known to those of skill in the art.

The capacitor-assisted electrode also includes the polymeric binder and optionally electrically conductive particles in the composite hybrid active layer. The polymeric binder may be any of those used conventionally in the art, such as polyvinylidene difluoride (PVDF), poly(vinylidene fluoride)-co-hexafluoropropylene (PVDF-HFP), polytetrafluoroethylene (PTFE), sodium carboxymethyl cellulose (CMC), ethylene propylene diene monomer (EPDM) rubber, nitrile butadiene rubber (NBR), styrene-butadiene rubber (SBR), styrene ethylene butylene styrene copolymers (SEBS), styrene butadiene styrene copolymers (SBS), polyethylene glycol (PEO), and/or lithium polyacrylate (LiPAA) binders. In certain variations, the binder comprises polyvinylidene difluoride (PVDF) and/or poly(vinylidene fluoride-co-hexafluoropropylene (PVDF-HFP).

The porous composite structure defining the composite hybrid active layer 110 may also include an electrically conductive material, such as a plurality of electrically conductive particles distributed therein. Electrically conductive materials may include, for example, carbon-based materials, conductive metal particles, or a conductive polymer. Carbon-based materials may include, for example, particles of carbon black (such as, Super P™), graphite, acetylene black (such as, KETCHEN' black or DENKA™ black), carbon fibers and carbon nanotubes (CNTs, including single walled and multiwalled CNTs), graphene, graphene oxide, graphite, and the like. Conductive metal particles may include nickel, gold, silver, copper, aluminum, and the like. Examples of a conductive polymer may include polyaniline, polythiophene, polyacetylene, polypyrrole, and the like. In certain aspects, the electrically conductive particle comprises a carbon black, for example, having a surface area of greater than or equal to about 50 m$^2$/g (BET), as measured "total surface area" via the Brunauer-Emmett-Teller (BET) method using nitrogen ($N_2$).

One such electrically conductive carbon black is Super P carbon black conductive filler commercially available from Imerys Ltd. having a surface area of greater than about 63.5 m$^2$/g (BET). In certain other aspects, the electrically conductive particle comprises a carbon nanotube (CNT), which also has a surface area of greater than or equal to about 50 m$^2$/g. In one variation, the conductive carbon-based material may be a conductive graphite, for example, having a surface area of greater than or equal to about 5 m$^2$/g to less than or equal to about 30 m$^2$/g with an average diameter (D) or D50 that is less than or equal to about 8 micrometers (pin). A D50 means a cumulative 50% point of diameter (or 50% pass particle size) for the plurality of solid particles. Such a conductive graphite particle is commercially available as TIMCAL TIMREX® KS6 Synthetic Graphite. In yet other aspects, the electrically conductive particles distributed in the positive active layer may comprise both a carbon black conductive filler particle, like Super P™, and a carbon nanotube (CNT).

Each of the electrically conductive particles may be present at greater than or equal to about 0 wt. % to less than or equal to about 10 wt. %, optionally greater than or equal to about 0.5 wt. % to less than or equal to about 15 wt. %, optionally greater than or equal to about 0.5 wt. % to less than or equal to about 10 wt. %, and in certain aspects, optionally greater than or equal to about 0.5 wt. % to less than or equal to about 6 wt. % of a total weight of the composite hybrid active layer.

As discussed above, the capacitive particles comprising carbon may be selected from the group consisting of activated carbon, carbon xerogel, carbon aerogel, carbon nanotube, mesoporous carbon, templated carbon, carbide-derived carbon, graphene, porous carbon spheres, heteroatom-doped carbon, and combinations thereof. In addition to the carbon-based capacitive materials treated with the cellulose-derived dispersant, the composite hybrid active layer may also comprise other capacitive materials. By way of example, pseudocapacitor materials may be included, such as noble metal oxides, noble metal hydroxides, transition metal oxides, transition metal hydroxides, and/or electrically conductive polymers. Examples of noble metal oxides and hydroxides include oxides and/or hydroxides of ruthenium (Ru), rhodium (Rh), iridium (Ir), platinum (Pt), palladium (Pd), osmium (Os), gold (Au), and/or rhenium (Re). Examples of transition metal oxides and hydroxides include oxides and/or hydroxides of manganese (Mn), nickel (Ni), cobalt (Co), lead (Pb), copper (Cu), and/or iron (Fe). Specific examples of metal oxides and/or hydroxides include ruthenium oxide ($RuO_2$), manganese oxide ($MnO_2$), nickel oxide (NiO), niobium oxide ($Nb_2O_5$), cobalt oxide ($Co_3O_4$), cobalt hydroxide ($Co(OH)_2$), and nickel hydroxide ($Ni(OH)_2$). Metal sulfides, such as $TiS_2$, CuS, FeS, and the like, may be included. Examples of electrically conductive polymers include polyacrylonitrile, polypyrrole, polythiophene, poly (3-methyl thiophene), polyaniline, poly(paraphenylene), polyacene, and/or polyacetylene. Any combinations of these capacitive particles (including pseudocapacitors) are also contemplated.

In certain variations, the capacitor-assisted hybrid electrode prepared in accordance with certain aspects of the present disclosure may have a total combined or cumulative amount of active materials, including electroactive particles and capacitive particles, at greater than or equal to about 80% to less than or equal to about 98% by mass of the composite hybrid active layer. For example, the electroactive particles may be present at greater than or equal to about 50% to less than or equal to about 96% by mass of the composite hybrid active layer, capacitive particles comprising carbon present at greater than or equal to about 2% to less than or equal to about 30% by mass of the composite hybrid active layer. The composite hybrid active layer also comprises electrically conductive particles present at greater than or equal to about 0.5 to less than or equal to about 15% by mass of the composite hybrid active layer, polymeric binder present at greater than or equal to about 0.5 to less than or equal to about 10% by mass of the composite hybrid active layer, and the cellulose-based dispersant (associate with the capacitive material comprising carbon) present at greater than or equal to about to less than or equal to about 5% by mass of the composite hybrid active layer. The composite hybrid active layer may further comprise a surfactant, as described above, at greater than or equal to about 0.001% to less than or equal to about 5% of the composite hybrid active layer or optionally greater than or equal to about 0.02% to less than or equal to about 1% by mass of the composite hybrid active layer.

In certain variations, a mass ratio of cellulose-based dispersant to a total mass of the composite hybrid active layer is greater than or equal to about 1:100,000 to less than or equal to about 1:20, or stated in another way, greater than or equal to about 0.001% to less than or equal to about 5%, optionally greater than or equal to about 1:5,000 to less than or equal to about 1:100 or stated in another way, greater than or equal to about 0.02% to less than or equal to about 1% by mass.

In certain variations, a composite hybrid active layer may have a thickness of greater than or equal to about 20 micrometers (μm) to less than or equal to about 100 μm. In certain aspects, the positive or negative current collector may have a thickness of greater than or equal to about 5 micrometers to less than or equal to about micrometers. A total thickness of a capacitor-assisted hybrid electrode prepared in accordance with certain aspects of the present disclosure may be greater than or equal to about 65 μm to less than or equal to about 315 μm. Such a thickness may include a composite hybrid active layer on a first side of a 15 μm thick current collector having a thickness of about 25 μm and a second active layer on the opposite side of the current collector having a thickness of about 25 μm (25 μm+15 μm+25 μm=65 μm). Alternatively, a first side of a 15 μm thick current collector may have a composite hybrid active layer at a thickness of about 150 μm and a second active layer on the opposite side of the current collector having a thickness of about 150 μm (150 μm+15 μm+150 μm=315 μm). In one variation, a total thickness of a capacitor-assisted hybrid electrode prepared in accordance with certain aspects of the present disclosure may be about 75 μm.

In certain variations, a capacity loading of the capacitor-assisted hybrid electrode prepared in accordance with certain aspects of the present disclosure is greater than or equal to about 0.5 mAh/cm$^2$ (at 1 C at room temperature, for example, approximately 21° C.) and optionally greater than or equal to about 0.5 mAh/cm$^2$ (at 1 C at room temperature). In certain variations, a capacity loading of the capacitor-assisted hybrid electrode is greater than or equal to about 0.5 mAh/cm$^2$ to less than or equal to about 5 mAh/cm$^2$ (at 1 C at room temperature) and optionally greater than or equal to about 0.9 mAh/cm$^2$ to less than or equal to about 1.5 mAh/cm$^2$ (at 1 C at room temperature).

A porosity of the composite hybrid active material layer, whether the positive or negative electrode after all processing is completed (including consolidation and calendering) may considered to be a fraction of void volume defined by pores over the total volume of the active material layer. The porosity may be greater than or equal to about 25% by volume to less than or equal to about 65% by volume, and in certain variations, optionally greater than or equal to 30% by volume to less than or equal to about 40% by volume.

Figure 5:
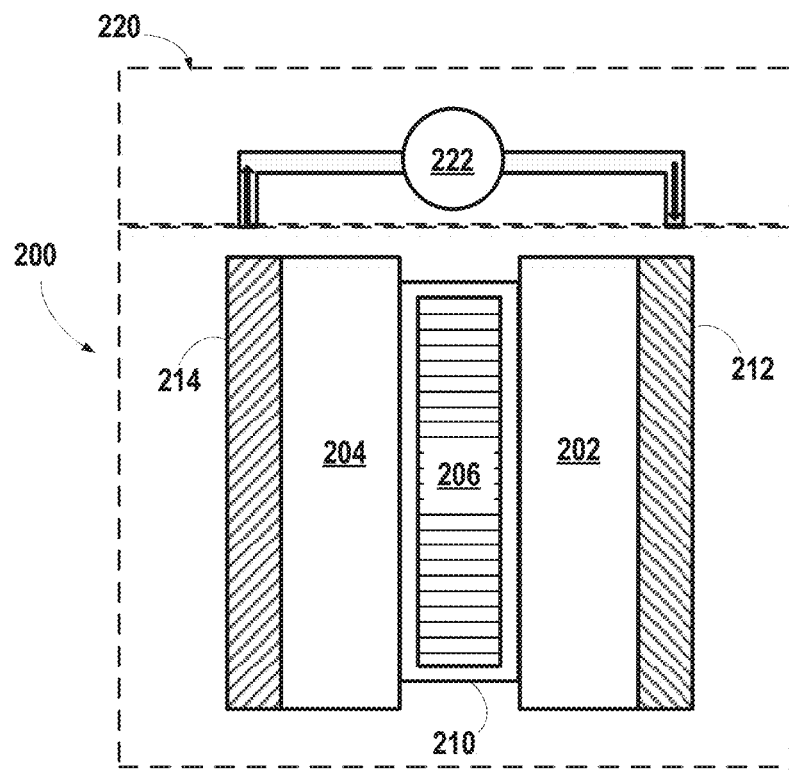
FIG. 5 shows an example of a lithium-ion electrochemical cell or battery into which a capacitor-assisted hybrid electrode prepared in accordance with certain aspects of the present disclosure can be incorporated.

The capacitor-assisted hybrid electrode prepared in accordance with certain aspects of the present disclosure may be incorporated into a lithium-ion electrochemical cell or battery 200, such as that shown in FIG. 5. Although the illustrated examples include a single positive electrode or cathode and a single negative electrode or anode, the skilled artisan will recognize that the present disclosure also contemplates various other configurations, including those having one or more cathodes and one or more anodes, as well as various current collectors with electroactive layers disposed on or adjacent to one or more surfaces thereof.

A typical lithium-ion battery 200 includes a first electrode (such as a negative electrode 202 or anode) opposing a second electrode (such as a positive electrode 204 or cathode) and a separator 206 and/or electrolyte 210 disposed therebetween. While not shown, often in a lithium-ion battery pack, batteries or cells may be electrically connected in a stack or winding configuration to increase overall output. As noted above, lithium-ion batteries operate by reversibly passing lithium ions between the first and second electrodes. For example, lithium ions may move from the positive electrode 204 to the negative electrode 202 during charging of the battery, and in the opposite direction when discharging the battery. The electrolyte 210 is suitable for conducting lithium ions and may be in liquid, gel, or solid form.

When a liquid or semi-liquid/gel electrolyte is used, the separator 206 (e.g., a microporous polymeric separator) is thus disposed between the two electrodes 202, 204 and may comprise the electrolyte 210, which may also be present in the pores of the negative electrode 202 and positive electrode 204. When a solid electrolyte is used, the microporous polymeric separator 206 may be omitted. The solid-state electrolyte may also be mixed into the negative electrode 202 and the positive electrode 204. A negative electrode current collector 212 may be positioned at or near the negative electrode 202 and a positive electrode current collector 214 may be positioned at or near the positive electrode 204. An interruptible external circuit 220 and a load device 222 connects the negative electrode 202 (through its current collector 212) and the positive electrode 204 (through its current collector 214).

The battery 200 can generate an electric current during discharge by way of reversible electrochemical reactions that occur when the external circuit 220 is closed (to connect the negative electrode 202 and the positive electrode 204) and the negative electrode 202 has a lower potential than the positive electrode. The chemical potential difference between the positive electrode 204 and the negative electrode 202 drives electrons produced by a reaction, for example, the oxidation of intercalated lithium, at the negative electrode 202 through the external circuit 220 towards the positive electrode 204. Lithium ions that are also produced at the negative electrode 202 are concurrently transferred through the electrolyte 210 contained in the separator 206 towards the positive electrode 204. The electrons flow through the external circuit 220 and the lithium ions migrate across the separator 206 containing the electrolyte solution 210 to form intercalated lithium at the positive electrode 204. As noted above, electrolyte 210 is typically also present in the negative electrode 202 and positive electrode 204. The electric current passing through the external circuit 220 can be harnessed and directed through the load device 222 until the lithium in the negative electrode 202 is depleted and the capacity of the battery 200 is diminished. Notably, either the positive electrode 204 or the negative electrode 202 may be a capacitor-assisted hybrid electrode prepared in accordance with the present disclosure that provides not only high energy capacity, but also high charge capacity during operation, as needed. In certain variations, the positive electrode 204 is a capacitor-assisted hybrid electrode or cabode, as discussed above.

The battery 200 can be charged or re-energized at any time by connecting an external power source to the lithium ion battery 200 to reverse the electrochemical reactions that occur during battery discharge. Connecting an external electrical energy source to the battery 200 promotes a reaction, for example, non-spontaneous oxidation of transition metal ions, at the positive electrode 204 so that electrons and lithium ions are produced. The lithium ions flow from the negative electrode 202 through the electrolyte 210 across the separator 206 to replenish the positive electrode 204 with lithium for use during the next battery discharge event. As such, a complete discharging event followed by a complete charging event is considered to be a cycle, where lithium ions are cycled between the positive electrode 204 and the negative electrode 202. The external power source that may be used to charge the battery 200 may vary depending on the size, construction, and particular end-use of the battery 200. Some notable and exemplary external power sources include, but are not limited to, an AC-DC converter connected to an AC electrical power grid though a wall outlet and a motor vehicle alternator.

In many lithium-ion battery configurations, each of the negative electrode current collector 212, negative electrode 202, the separator 206, positive electrode 204, and positive electrode current collector 214 are prepared as relatively thin layers (for example, from several microns to a fraction of a millimeter or less in thickness) and assembled in layers connected in electrical parallel arrangement to provide a suitable electrical energy and power package. The negative electrode current collector 212 and positive electrode current collector 214 respectively collect and move free electrons to and from an external circuit 220.

Further, as noted above, when a liquid or semi-liquid electrolyte is used, the separator 206 operates as an electrical insulator by being sandwiched between the negative electrode 202 and the positive electrode 204 to prevent physical contact and thus, the occurrence of a short circuit. The separator 206 provides not only a physical and electrical barrier between the two electrodes 202, 204, but also contains the electrolyte solution in a network of open pores during the cycling of lithium ions, to facilitate functioning of the battery 200. The solid-state electrolyte layer may serve a similar ion conductive and electrically insulating function, but without needing a separator 206 component.

The battery 200 can include a variety of other components that while not depicted here are nonetheless known to those of skill in the art. For instance, the battery 200 may include a casing, gaskets, terminal caps, tabs, battery terminals, and any other conventional components or materials that may be situated within the battery 200, including between or around the negative electrode 202, the positive electrode 204, and/or the separator 206. The battery 200 shown in FIG. 5 includes a liquid electrolyte 210 and shows representative concepts of battery operation. However, the battery 200 may also be a solid-state battery that includes a solid-state electrolyte that may have a different design, as known to those of skill in the art.

Electrodes, including capacitor-assisted hybrid electrodes, can generally be incorporated into various commercial battery designs, such as prismatic shaped cells, wound cylindrical cells, coin cells, pouch cells, or other suitable cell shapes. The cells can include a single electrode structure of each polarity or a stacked structure with a plurality of positive electrodes and negative electrodes assembled in parallel and/or series electrical connections. In particular, the battery can include a stack of alternating positive electrodes and negative electrodes with separators disposed therebetween. While the positive electroactive materials can be used in batteries for primary or single charge use, the resulting batteries generally have desirable cycling properties for secondary battery use over multiple cycling of the cells.

As noted above, the size and shape of the battery 200 may vary depending on the particular application for which it is designed. Battery-powered vehicles and hand-held consumer electronic devices, for example, are two examples where the battery 200 would most likely be designed to different size, capacity, and power-output specifications. The battery 200 may also be connected in series or parallel with other similar lithium-ion cells or batteries to produce a greater voltage output, energy, and power if it is required by the load device 222. Accordingly, the battery 200 can generate electric current to a load device 222 that is part of the external circuit 220. The load device 222 may be powered by the electric current passing through the external circuit 220 when the battery 200 is discharging. While the electrical load device 222 may be any number of known electrically-powered devices, a few specific examples include an electric motor for an electrified vehicle, a laptop computer, a tablet computer, a cellular phone, and cordless power tools or appliances. The load device 222 may also be an electricity-generating apparatus that charges the battery 200 for purposes of storing electrical energy.

The positive electrode 204, the negative electrode 202, and the separator 206 may each include an electrolyte solution or system 210 inside their pores, capable of conducting lithium ions between the negative electrode 202 and the positive electrode 204. Any appropriate electrolyte 210 whether in solid, liquid, or gel form, capable of conducting lithium ions between the negative electrode 202 and the positive electrode 204 may be used in the lithium-ion battery 200. In certain aspects, the electrolyte 210 may be a non-aqueous liquid electrolyte solution that includes a lithium salt dissolved in an organic solvent or a mixture of organic solvents. Numerous conventional non-aqueous liquid electrolyte 210 solutions may be employed in the lithium-ion battery 200.

In certain aspects, the electrolyte 210 may be a non-aqueous liquid electrolyte solution that includes one or more lithium salts dissolved in an organic solvent or a mixture of organic solvents. For example, anon-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), and combinations thereof.

These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-di methoxy ethane, 1-2-di ethoxy ethane, ethoxymethoxyethane), cyclic ethers (e.g., tetrahydrofuran, 2-methyltetrahydrofuran, 1,3-dioxolane), sulfur compounds (e.g., sulfolane), and combinations thereof.

The porous separator 206 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

In certain aspects, the separator 206 may further include one or more of a ceramic coating layer and a heat-resistant material coating. The ceramic coating layer and/or the heat-resistant material coating may be disposed on one or more sides of the separator 206. The material forming the ceramic layer may be selected from the group consisting of: alumina ($Al_2O_3$), silica ($SiO_2$), and combinations thereof. The heat-resistant material may be selected from the group consisting of: NOMEX™ aramid, ARAMID polyamide, and combinations thereof.

When the separator 206 is a microporous polymeric separator, it may be a single layer or a multi-layer laminate, which may be fabricated from either a dry or a wet process. For example, in certain instances, a single layer of the polyolefin may form the entire separator 206. In other aspects, the separator 206 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 206. The separator 206 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 206 as a fibrous layer to help provide the separator 206 with appropriate structural and porosity characteristics. In certain aspects, the separator 206 may also be mixed with a ceramic material or its surface may be coated in a ceramic material. For example, a ceramic coating may include alumina ($Al_2O_3$), silicon dioxide ($SiO_2$), titania ($TiO_2$) or combinations thereof. Various conventionally available polymers and commercial products for forming the separator 206 are contemplated, as well as the many manufacturing methods that may be employed to produce such a microporous polymer separator 206.

In various aspects, the porous separator 206 and the electrolyte 210 in FIG. 5 may be replaced with a solid-state electrolyte (SSE) (not shown) that functions as both an electrolyte and a separator. The SSE may be disposed between the positive electrode 204 and negative electrode 202. The SSE facilitates transfer of lithium ions, while mechanically separating and providing electrical insulation between the negative and positive electrodes 202, 204. The SSE may be a solid-state inorganic compound or a solid-state polymer electrolyte. By way of non-limiting example, SSEs may include $LiTi_2(PO_4)_3$, $LiGe_2(PO_4)_3$, $Li_7La_3Zr_2O_{12}$, $Li_3xLa_{2/3}-xTiO_3$, $Li_3PO_4$, $Li_3N$, $Li_4GeS_4$, $LiioGeP_2S_{12}$, $Li_2S-P_2S_5$, $Li_6PS_5C_1$, $Li_6PS_5Br$, $Li_6PS_5I$, $Li_{30}C_1$, $Li_{2.99}Ba_{0.005}C_{10}$, polyethylene oxide (PEO) based polymers, polycarbonates, polyesters, polynitriles (e.g., polyacrylonitrile (PAN)), polyalcohols (e.g., polyvinyl alcohol (PVA)), polyamines (e.g., polyethyleneimine (PEI)), polysiloxane (e.g., polydimethylsiloxane (PDMS)) and fluoropolymers (e.g., polyvinylidene fluoride (PVdF), polyvinylidene fluoride-hexafluoropropylene (PVDF-HFP)), biopolymers like lignin, chitosan and cellulose, and any combinations thereof.

The methods of the present disclosure form capacitor-assisted hybrid electrodes for lithium-ion electrochemical cells that can avoid uneven distribution and/or agglomeration of carbon-based capacitive particles and carbon-based electrically conductive particles in a composite hybrid active layer. A cellulose-based dispersant, such as a fiber-type dispersant is used to modify a surface of the carbon-based capacitive particles, which provides the advantages of dispersing the carbon-based capacitive particles and carbon-based conductive materials and minimizing or avoiding agglomeration between the carbon-based capacitive particles and carbon-based conductive materials. Moreover, the methods provided by the present disclosure can be readily implemented in plants that employ conventional slurry mixing equipment. By minimizing eliminating agglomeration of the carbon-based capacitive particles and carbon-based conductive materials, uniform distribution of the components in the composite hybrid active layer provides the advantages of improving power performance of the capacitor-assisted hybrid electrode.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a capacitor-assisted hybrid electrode for a lithium-ion electrochemical cell, the method comprising:
    admixing a first solvent, a cellulose-based dispersant, and a plurality of capacitive particles comprising carbon to form a first dispersion, wherein the cellulose-based dispersant forms hydrogen bonds with one or more carbonyl-groups on the capacitive particles comprising carbon;
    admixing a polymeric binder and a second solvent to form a second dispersion;
    adding an electrically conductive material to the second dispersion;
    combining the first dispersion and the second dispersion;
    introducing an electroactive material to the combination of the first dispersion and the second dispersion to form a slurry; and
    applying the slurry to a current collector and solidifying the slurry to form the capacitor-assisted hybrid electrode having a composite hybrid active layer on the current collector.

2. The method of claim 1, wherein the cellulose-based dispersant is selected from the group consisting of: methyl cellulose, hydroxyethyl cellulose, hydroxypropyl methyl cellulose, hydroxypropyl cellulose, carboxymethyl cellulose, and combinations thereof.

3. The method of claim 1, wherein a ratio of mass of the cellulose-based dispersant to the plurality of capacitive particles comprising carbon is greater than or equal to about 1:10,000 to less than or equal to about 1:4.

4. The method of claim 1, wherein a mass ratio of cellulose-based dispersant to the plurality of capacitive particles comprising carbon is greater than or equal to about 1:200 to less than or equal to about 1:20.

5. The method of claim 1, wherein the dispersion further comprises a non-ionic ester-based surfactant.

6. The method of claim 1, wherein a ratio of mass of the cellulose-based dispersant to a total mass of the composite hybrid active layer is greater than or equal to about 1:100,000 to less than or equal to about 1:20.

7. The method of claim 1, wherein a ratio of mass of the cellulose-based dispersant to a total mass of the composite hybrid active layer is greater than or equal to about 1:5,000 to less than or equal to about 1:100.

8. The method of claim 1, wherein the plurality of capacitive particles comprising carbon comprise activated carbon and the electrically conductive material comprises carbon black.

9. The method of claim 1, wherein the plurality of capacitive particles comprising carbon are homogeneously distributed in the composite hybrid active layer.

10. The method of claim 1, wherein the electroactive material is a positive electroactive material selected from the group consisting of: a rock salt layered oxide, a spinel, a polyanion cathode, a lithium-transition metal oxide, a lithium borate, a lithium-silicon alloying compound, lithium-tin alloying compound, lithium metal, lithium alloy, lithiated metal oxide/sulfide, lithium sulfide, sulfur, and combinations thereof.

11. The method of claim 1, wherein the composite hybrid active layer comprises the electroactive material at greater than or equal to about 50% to less than or equal to about 96% by mass of the composite hybrid active layer, the plurality of capacitive particles comprising carbon at greater than or equal to about 2% to less than or equal to about 30% by mass of the composite hybrid active layer, the electrically conductive material at greater than or equal to about 0.5 to less than or equal to about 15% by mass of the composite hybrid active layer, the polymeric binder at greater than or equal to about 0.5 to less than or equal to about 10% by mass of the composite hybrid active layer, and the cellulose-based dispersant at greater than or equal to about 0.01% to less than or equal to about 5% by mass of the composite hybrid active layer.

12. A method of making a capacitor-assisted hybrid electrode for a lithium-ion electrochemical cell, the method comprising:
   admixing a first solvent, a cellulose-based dispersant, and a plurality of capacitive particles comprising carbon to form a dispersion, wherein the cellulose-based dispersant forms hydrogen bonds with one or more carbonyl-groups on the capacitive particles comprising carbon;
   dry mixing a polymeric binder, an electrically conductive material, and an electroactive material together to form a dry mixture;
   adding a second solvent to the dry mixture to form an admixture;
   kneading the admixture;
   adding a third solvent to the admixture and mixing to form a slurry; and
   applying the slurry to a current collector and solidifying the slurry to form the capacitor-assisted hybrid electrode having a composite hybrid active layer on the current collector.

13. The method of claim 12, wherein a ratio of mass of the cellulose-based dispersant to the plurality of capacitive particles comprising carbon is greater than or equal to about 1:10,000 to less than or equal to about 1:4.

14. The method of claim 12, wherein a mass ratio of cellulose-based dispersant to the plurality of capacitive particles comprising carbon is greater than or equal to about 1:200 to less than or equal to about 1:20.

15. The method of claim 12, wherein the dispersion further comprises a non-ionic ester-based surfactant.

16. The method of claim 12, wherein a ratio of mass of the cellulose-based dispersant to a total mass of the composite hybrid active layer is greater than or equal to about 1:100,000 to less than or equal to about 1:20.

17. The method of claim 12, wherein a ratio of mass of the cellulose-based dispersant to a total mass of the composite hybrid active layer is greater than or equal to about 1:5,000 to less than or equal to about 1:100.

18. The method of claim 12, wherein the plurality of capacitive particles comprising carbon comprise activated carbon and the electrically conductive material comprises carbon black.

19. The method of claim 12, wherein the plurality of capacitive particles comprising carbon are homogeneously distributed in the composite hybrid active layer.

20. The method of claim 12, wherein the composite hybrid active layer comprises the electroactive material at greater than or equal to about 50% to less than or equal to about 96% by mass of the composite hybrid active layer, the plurality of capacitive particles comprising carbon at greater than or equal to about 2% to less than or equal to about 30% by mass of the composite hybrid active layer, the electrically conductive material at greater than or equal to about 0.5 to less than or equal to about 15% by mass of the composite hybrid active layer, the polymeric binder at greater than or equal to about 0.5 to less than or equal to about 10% by mass of the composite hybrid active layer, and the cellulose-based dispersant at greater than or equal to about 0.01% to less than or equal to about 5% by mass of the composite hybrid active layer.

* * * * *